(12) United States Patent
Förstner (10) Patent No.: US 10,212,505 B2
(45) Date of Patent: Feb. 19, 2019

(54) MULTI-POINT MULTIPLE SENSOR ARRAY FOR DATA SENSING AND PROCESSING SYSTEM AND METHOD

(71) Applicant: BRAGI GmbH, München (DE)

(72) Inventor: Friedrich Christian Förstner, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/866,347

(22) Filed: Jan. 9, 2018

(65) Prior Publication Data
US 2018/0146275 A1 May 24, 2018

Related U.S. Application Data

(63) Continuation of application No. 15/290,417, filed on Oct. 11, 2016, now Pat. No. 9,866,941.
(Continued)

(51) Int. Cl.
*H04R 1/10* (2006.01)
*G06F 3/16* (2006.01)
(Continued)

(52) U.S. Cl.
CPC .......... *H04R 1/1016* (2013.01); *G06F 3/162* (2013.01); *G06K 9/00885* (2013.01);
(Continued)

(58) Field of Classification Search
CPC .... H04R 1/1016; H04R 1/1091; H04R 25/00; H04R 2420/07; G06F 3/162; G06K 9/00885
(Continued)

(56) References Cited

U.S. PATENT DOCUMENTS 2,325,590 A 8/1943 Carlisle et al.
2,430,229 A 11/1947 Kelsey
(Continued)

FOREIGN PATENT DOCUMENTS

CN 204244472 U 4/2015
CN 104683519 A 6/2015
(Continued)

OTHER PUBLICATIONS

The Dash—A Word From Our Software, Mechanical and Acoustics Team + An Update (Mar. 11, 2014).
(Continued)

*Primary Examiner* — William A Jerez Lora
(74) *Attorney, Agent, or Firm* — Goodhue, Coleman & Owens, P.C.

(57) ABSTRACT

A method for enhancing sensor measurements includes performing measurements utilizing sensors of wireless earpieces, analyzing the measurements to determine statistical confidence in the measurements, and determining whether the measurements are accurate utilizing the statistical confidence. The measurements may be biometric measurements of a user utilizing the wireless earpieces. The measurements may be environmental measurements. A wireless earpiece may include a frame for fitting in an ear of a user, a logic engine controlling functionality of the wireless earpiece, and a plurality of sensor performing biometric measurements of the user. The logic engine perform measurements utilizing a plurality of sensors of the wireless earpiece, analyzes the measurements to determine a statistical confidence interval of the measurements, determines whether the measurements are accurate utilizing the statistical confidence interval, and optimizes the measurements to determine a biometric reading of the user in response to determining the measurements are not accurate.

16 Claims, 3 Drawing Sheets

Related U.S. Application Data (60) Provisional application No. 62/244,144, filed on Oct. 20, 2015.

(51) Int. Cl.
*G06K 9/00* (2006.01)
*H04R 1/02* (2006.01)
*H04R 25/00* (2006.01)

(52) U.S. Cl.
CPC ........... *H04R 1/028* (2013.01); *H04R 1/1091* (2013.01); *H04R 25/00* (2013.01); *H04R 2420/07* (2013.01)

(58) Field of Classification Search
USPC .................................. 381/56, 58, 94.1, 94.2
See application file for complete search history.

(56) References Cited

U.S. PATENT DOCUMENTS

| | | |
|---|---|---|
| 3,047,089 A | 7/1962 | Zwislocki |
| D208,784 S | 10/1967 | Sanzone |
| 3,586,794 A | 6/1971 | Michaelis |
| 3,934,100 A | 1/1976 | Harada |
| 3,983,336 A | 9/1976 | Malek et al. |
| 4,069,400 A | 1/1978 | Johanson et al. |
| 4,150,262 A | 4/1979 | Ono |
| 4,334,315 A | 6/1982 | Ono et al. |
| D266,271 S | 9/1982 | Johanson et al. |
| 4,375,016 A | 2/1983 | Harada |
| 4,588,867 A | 5/1986 | Konomi |
| 4,617,429 A | 10/1986 | Bellafiore |
| 4,654,883 A | 3/1987 | Iwata |
| 4,682,180 A | 7/1987 | Gans |
| 4,791,673 A | 12/1988 | Schreiber |
| 4,852,177 A | 7/1989 | Ambrose |
| 4,865,044 A | 9/1989 | Wallace et al. |
| 4,984,277 A | 1/1991 | Bisgaard et al. |
| 5,008,943 A | 4/1991 | Arndt et al. |
| 5,185,802 A | 2/1993 | Stanton |
| 5,191,602 A | 3/1993 | Regen et al. |
| 5,201,007 A | 4/1993 | Ward et al. |
| 5,201,008 A | 4/1993 | Arndt et al. |
| D340,286 S | 10/1993 | Seo |
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,347,584 A | 9/1994 | Narisawa |
| 5,363,444 A | 11/1994 | Norris |
| D367,113 S | 2/1996 | Weeks |
| 5,497,339 A | 3/1996 | Bernard |
| 5,606,621 A | 2/1997 | Reiter et al. |
| 5,613,222 A | 3/1997 | Guenther |
| 5,654,530 A | 8/1997 | Sauer et al. |
| 5,692,059 A | 11/1997 | Kruger |
| 5,721,783 A | 2/1998 | Anderson |
| 5,748,743 A | 5/1998 | Weeks |
| 5,749,072 A | 5/1998 | Mazurkiewicz et al. |
| 5,771,438 A | 6/1998 | Palermo et al. |
| D397,796 S | 9/1998 | Yabe et al. |
| 5,802,167 A | 9/1998 | Hong |
| D410,008 S | 5/1999 | Almqvist |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,084,526 A | 7/2000 | Blotky et al. |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,230,029 B1 | 5/2001 | Yegiazaryan et al. |
| 6,275,789 B1 | 8/2001 | Moser et al. |
| 6,339,754 B1 | 1/2002 | Flanagan et al. |
| D455,835 S | 4/2002 | Anderson et al. |
| 6,408,081 B1 | 6/2002 | Boesen |
| 6,424,820 B1 | 7/2002 | Burdick et al. |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,563,301 B2 | 5/2003 | Gventer |
| 6,654,721 B2 | 11/2003 | Handelman |
| 6,664,713 B2 | 12/2003 | Boesen |
| 6,690,807 B1 | 2/2004 | Meyer |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,010,137 B1 | 3/2006 | Leedom et al. |
| 7,113,611 B2 | 9/2006 | Leedom et al. |
| D532,520 S | 11/2006 | Kampmeier et al. |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| D549,222 S | 8/2007 | Huang |
| D554,756 S | 11/2007 | Sjursen et al. |
| 7,403,629 B1 | 7/2008 | Aceti et al. |
| D579,006 S | 10/2008 | Kim et al. |
| 7,463,902 B2 | 12/2008 | Boesen |
| 7,508,411 B2 | 3/2009 | Boesen |
| D601,134 S | 9/2009 | Elabidi et al. |
| 7,825,626 B2 | 11/2010 | Kozisek |
| 7,965,855 B1 | 6/2011 | Ham |
| 7,979,035 B2 | 7/2011 | Griffin et al. |
| 7,983,628 B2 | 7/2011 | Boesen |
| D647,491 S | 10/2011 | Chen et al. |
| 8,095,188 B2 | 1/2012 | Shi |
| 8,108,143 B1 | 1/2012 | Tester |
| 8,140,357 B1 | 3/2012 | Boesen |
| D666,581 S | 9/2012 | Perez |
| 8,300,864 B2 | 10/2012 | Müllenborn et al. |
| 8,406,448 B2 | 3/2013 | Lin et al. |
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 2001/0005197 A1 | 6/2001 | Mishra et al. |
| 2001/0027121 A1 | 10/2001 | Boesen |

(56) References Cited

U.S. PATENT DOCUMENTS

| | | |
|---|---|---|
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2008/0076972 A1 | 3/2008 | Dorogusker et al. |
| 2008/0090622 A1 | 4/2008 | Kim et al. |
| 2008/0146890 A1 | 6/2008 | LeBoeuf et al. |
| 2008/0187163 A1 | 8/2008 | Goldstein et al. |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2010/0033313 A1 | 2/2010 | Keady et al. |
| 2010/0203831 A1 | 8/2010 | Muth |
| 2010/0210212 A1 | 8/2010 | Sato |
| 2010/0320961 A1 | 12/2010 | Castillo et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2012/0057740 A1 | 3/2012 | Rosal |
| 2012/0155670 A1 | 6/2012 | Rutschman |
| 2012/0309453 A1 | 12/2012 | Maguire |
| 2013/0106454 A1 | 5/2013 | Liu et al. |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0110587 A1 | 4/2015 | Hori |
| 2015/0148989 A1 | 5/2015 | Cooper et al. |
| 2015/0181356 A1 | 6/2015 | Krystek et al. |
| 2015/0245127 A1 | 8/2015 | Shaffer |
| 2015/0264472 A1 | 9/2015 | Aase |
| 2015/0264501 A1 | 9/2015 | Hu et al. |
| 2015/0317565 A1* | 11/2015 | Li .................. G06N 5/048 706/52 |
| 2015/0358751 A1 | 12/2015 | Deng et al. |
| 2015/0359436 A1 | 12/2015 | Shim et al. |
| 2015/0373467 A1 | 12/2015 | Gelter |
| 2015/0373474 A1 | 12/2015 | Kraft et al. |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Lindén et al. |
| 2016/0125892 A1 | 5/2016 | Bowen et al. |
| 2016/0162259 A1 | 6/2016 | Zhao et al. |
| 2016/0209691 A1 | 7/2016 | Yang et al. |
| 2016/0253994 A1* | 9/2016 | Panchapagesan ....... G10L 15/22 704/233 |
| 2016/0324478 A1* | 11/2016 | Goldstein ............ A61B 5/721 |
| 2016/0353196 A1 | 12/2016 | Baker et al. |
| 2016/0360350 A1 | 12/2016 | Watson et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0178631 A1 | 6/2017 | Boesen |
| 2017/0180842 A1 | 6/2017 | Boesen |

(56) References Cited

U.S. PATENT DOCUMENTS

| | | | |
|---|---|---|---|
| 2017/0180843 | A1 | 6/2017 | Perianu et al. |
| 2017/0180897 | A1 | 6/2017 | Perianu |
| 2017/0188127 | A1 | 6/2017 | Perianu et al. |
| 2017/0188132 | A1 | 6/2017 | Hirsch et al. |
| 2017/0193978 | A1 | 7/2017 | Goldman |
| 2017/0195829 | A1 | 7/2017 | Belverato et al. |
| 2017/0208393 | A1 | 7/2017 | Boesen |
| 2017/0214987 | A1 | 7/2017 | Boesen |
| 2017/0215016 | A1 | 7/2017 | Dohmen et al. |
| 2017/0230752 | A1 | 8/2017 | Dohmen et al. |
| 2017/0251933 | A1 | 9/2017 | Braun et al. |
| 2017/0257698 | A1 | 9/2017 | Boesen et al. |
| 2017/0263236 | A1 | 9/2017 | Boesen et al. |
| 2017/0273622 | A1 | 9/2017 | Boesen |
| 2017/0280257 | A1 | 9/2017 | Gordon et al. |
| 2017/0366233 | A1 | 12/2017 | Hviid et al. |
| 2018/0007994 | A1 | 1/2018 | Boesen et al. |
| 2018/0008194 | A1 | 1/2018 | Boesen |
| 2018/0008198 | A1 | 1/2018 | Kingscott |
| 2018/0009447 | A1 | 1/2018 | Boesen et al. |
| 2018/0011006 | A1 | 1/2018 | Kingscott |
| 2018/0011682 | A1 | 1/2018 | Milevski et al. |
| 2018/0011994 | A1 | 1/2018 | Boesen |
| 2018/0012228 | A1 | 1/2018 | Milevski et al. |
| 2018/0013195 | A1 | 1/2018 | Hviid et al. |
| 2018/0014102 | A1 | 1/2018 | Hirsch et al. |
| 2018/0014103 | A1 | 1/2018 | Martin et al. |
| 2018/0014104 | A1 | 1/2018 | Boesen et al. |
| 2018/0014107 | A1 | 1/2018 | Razouane et al. |
| 2018/0014108 | A1 | 1/2018 | Dragicevic et al. |
| 2018/0014109 | A1 | 1/2018 | Boesen |
| 2018/0014113 | A1 | 1/2018 | Boesen |
| 2018/0014140 | A1 | 1/2018 | Milevski et al. |
| 2018/0014436 | A1 | 1/2018 | Milevski |
| 2018/0034951 | A1 | 2/2018 | Boesen |
| 2018/0040093 | A1 | 2/2018 | Boesen |
| 2018/0042501 | A1* | 2/2018 | Adi |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Update From BRAGI—$3,000,000—Yipee (Mar. 22, 2014).
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XPO55334602, DOI: 10.3390/s151025681.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @BRAGI—Prototypes (Jun. 26, 2014).
BRAGI Update—Office Tour, Tour to China, Tour to CES (Dec. 11, 2014).
BRAGI Update—Status on Wireless, Bits and Pieces, Testing—Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, on Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).

(56) References Cited

OTHER PUBLICATIONS

Hoyt et. al., "Lessons Learned from Implementation of Voice Recognition for Documentation in the Military Electronic Health Record System", The American Health Information Management Association (2017).
Hyundai Motor America, "Hyundai Motor Company Introduces A Health + Mobility Concept for Wellness in Mobility", Fountain Valley, Califortna (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
Jain A et al: "Score normalization in multimodal biometric systems", Pattern Recognition, Elsevier, GB, vol. 38, No. 12, Dec. 31, 2005, pp. 2270-2285, XPO27610849, ISSN: 0031-3203.
Last Push Before the Kickstarter Campaign Ends on Monday 4pm CET (Mar. 28, 2014).
Nemanja Paunovic et al, "A methodology for testing complex professional electronic systems", Serbian Journal of Electrical Engineering, vol. 9, No. 1, Feb. 1, 2012, pp. 71-80, XPO55317584, YU.
Nigel Whitfield: "Fake tape detectors, 'from the stands' footie and UGH? Internet of Things in my set-top box"; http://www.theregister.co.uk/2014/09/24/ibc_round_up_object_audio_dlna_iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometrics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—Its Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & The BRAGI News (Feb. 21, 2014).

* cited by examiner

MULTI-POINT MULTIPLE SENSOR ARRAY FOR DATA SENSING AND PROCESSING SYSTEM AND METHOD

PRIORITY STATEMENT

This application claims priority to U.S. patent application Ser. No. 15/290,417 filed Oct. 11, 2016, which claims priority to U.S. Provisional Patent Application 62/244,144, filed on Oct. 20, 2015, and entitled Multi-Point Multiple Sensor Array For Data Sensing And Processing System and Method, all of which are hereby incorporated by reference in its entirety.

BACKGROUND

I. Field of the Disclosure

The illustrative embodiments relate to biometric identification. More specifically, but not exclusively, the illustrative embodiments relate to biometric measurements, analysis, and determinations made by wireless earpieces.

II. Description of the Art

The growth of wearable devices is increasing exponentially. This growth is fostered by the decreasing size of microprocessors, circuity boards, chips, and other components. It may be difficult to perform biometric sensing utilizing wearables. For example, current biometric sensors may be limited by their position on the body, shearing stresses, available power, exposure to caustic agents, and accuracy of the sensed modality through the sensor itself. Sometimes the sensed data is less accurate than desired resulting in failures to authenticate, slow processing, or so forth.

SUMMARY OF THE DISCLOSURE

Therefore, it is a primary object, feature, or advantage of the present invention to improve over the state of the art.

It is a further object, feature, or advantage of the present invention to provide for the availability of sensors at a second point in the body to allow for signal extraction from two point sources to determine the most accurate biometric results.

It is a still further object, feature, or advantage to provide for the availability of sensors at distal locations to allow programming to select from more than two points on order to provide the most accurate data. For example, signal sensing may be algorithmically optimized to the use of a heart rate strap if the strap was reporting clearer data than either one of the summated results of two inputs.

It is another object, feature, or advantage of the present invention to provide an algorithm with the ability to shift to the sensor or sensor array that provides the cleanest and most accurate or otherwise best signal.

It is another object, feature, or advantage to provide the enhanced ability to extract motion noise from the algorithm from the use of combined sensor and/or sensor modality systems.

It is another object, feature, or advantage to provide the ability to allow for additional sensors in the personal area network to enhance the signal gathering or purification process and provide still further refinement of the resultant data reported.

It is another object, feature, or advantage to provide the option to add greater accuracy through widening of the sensor array for data point measurements.

Yet another object, feature, or advantage is to provide the ability of the algorithm to allow for the addition of new features to the system through the addition of more data measurement points and data analysis.

Yet another object, feature, or advantage is to provide for enhanced body performance analysis through monitoring of fluid flows, electrical signals, tension or other physiologic parameters.

A further object, feature, or advantage is to build a reference system through aggregated data analytics.

One or more of these and/or other objects, features, or advantages of the present invention will become apparent from the specification and claims that follow. It is to be understood that different embodiments may have different objects, features, or advantages and objects, features, and advantages may be independent from one another, thus no single embodiment need to have any or all of the objects, features, and advantages listed herein.

According to one aspect, a method for enhancing sensor measurements is provided. The method includes performing measurements utilizing sensors of wireless earpieces, analyzing the measurements to determine statistical confidence in the measurements, and determining whether the measurements are accurate utilizing the statistical confidence. The measurements may be biometric measurements of a user utilizing the wireless earpieces. The measurements may be environmental measurements.

According to another aspect a set of one or more wireless earpieces includes a processor for executing a set of instructions, a memory for storing the set of instructions, wherein the set of instructions are executed to perform measurements utilizing a plurality of sensors of the one or more wireless earpieces, analyze the measurements to determine statistical confidence in the measurements, determine whether the measurements are accurate utilizing the statistical confidence, and optimize the measurements in response to determining the measurements are not accurate. The set of instructions may be further configured to determine one or more biometric readings of a user wearing the one or more wireless earpieces utilizing the measurements. The measurements may be optimized by filtering noise from the measurements utilizing additional measurements from the plurality of sensors. The one or more wireless earpieces may include at least a left wireless earpiece and a right wireless earpiece, and wherein the plurality of sensors include at least a pulse oximeter and an accelerometer. The measurements may be optimized by aggregating measurements taken by the plurality of sensors. The set of instructions may be further executed to shift between measurements made by the plurality of sensors to fine one of the measurements with the least noise and distortion. The one or more wireless earpieces may communicate with one or more external devices including sensors to optimize the measurements.

According to another aspect, a wireless earpiece includes a frame for fitting in an ear of a user, a logic engine controlling functionality of the wireless earpiece, and a plurality of sensor performing biometric measurements of the user. The logic engine may perform measurements utilizing a plurality of sensors of the wireless earpiece, analyze the measurements to determine a statistical confidence interval of the measurements, determine whether the measurements are accurate utilizing the statistical confidence interval, and optimize the measurements to determine a biometric reading of the user in response to determining the measurements are not accurate. The wireless earpiece may provide for ignoring one or more sensors with noisy signal measurements. The wireless earpiece may be one of a pair of wireless earpieces. The logic engine may filter a first measurement utilizing a second measurement from within the measurements. The measurements may be aggregated to determine the biometric reading. The logic engine may switch between the measurements of the plurality of sensors in response to noisy measurements.

BRIEF DESCRIPTION OF THE DRAWINGS

Illustrated embodiments of the present invention are described in detail below with reference to the attached drawing figures, which are incorporated by reference herein, and where.

DETAILED DESCRIPTION OF THE DISCLOSURE

The illustrative embodiments provide a system and method for processing data retrieved by one or more sensors of an electronic device. Sensor data may be utilized from more than one sensor to make determinations regarding the accuracy of the sensor data. The sensors may include temperature sensors, pulse oximeters, accelerometers, gyroscopes, altitude sensors, GPS chips, and so forth. The sensors may be utilized to sense any number of biometric readings or information, such as heart rate, respiratory rate, blood, or skin physiology, or other biometric data. In one embodiment, the electronic device is one or more wireless earpieces. The wireless earpieces may be utilized to make and receive communications (e.g., telephone calls, transcribed text messages, audio/tactile alerts, etc.), play music, filter or block sound, amplify sounds, or so forth.

The sensors may be stand-alone measurement devices or may be integrated in one or more chips, motherboards, cards, circuits, or so forth. For example, the wireless earpieces may include a pulse oximeter and accelerometer. A pulse oximeter is an oximeter that measures the proportion of oxygenated hemoglobin in the blood of a user in pulsating vessels. As described, herein the measurements are made of capillaries in the ear. The wireless earpieces may communicate with other wearables (e.g., smart watch, ring, jewelry, smart wearables, etc.) to modify, filter, or otherwise optimize the accuracy of sensor measurements.

In one embodiment, a sensor experiencing a high level of noise may be ignored or disregarded while utilizing the measurements from a different sensor. For example, accelerometer readings may be utilized to remove motion noise from pulse oximeters. The embodiments may also allow distinct sensor data to be utilized in analyzing, filtering, and otherwise processing the sensor measurements to provide the most accurate sensor readings possible.

Figure 1:
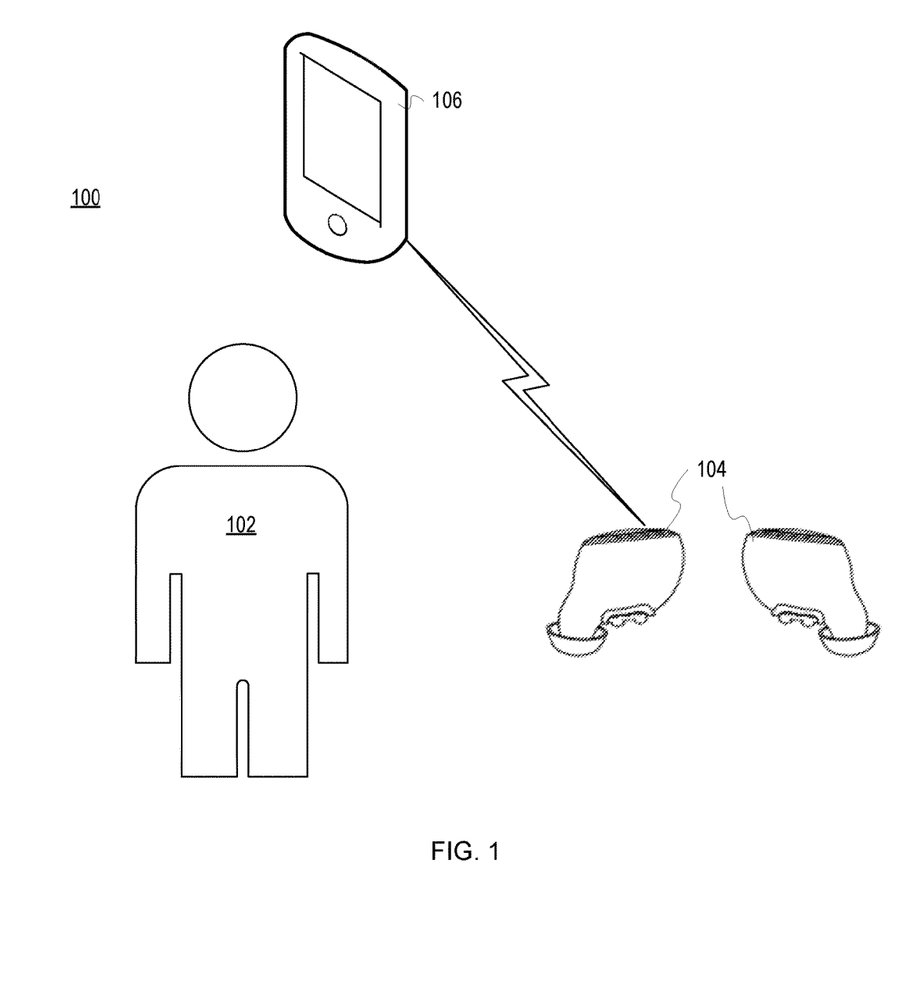
FIG. 1 is a pictorial representation of a communication system in accordance with an illustrative embodiment.

FIG. 1 is a pictorial representation of a communications system 100 in accordance with an illustrative embodiment. In one embodiment, the communication system 100 may include a user 102, wireless earpieces 104, and wireless device 106. The wireless earpieces 104 may be referred to as a pair or set (wireless earpieces 104) or singularly (wireless earpiece). The description may also refer to components and functionality of each of the wireless earpieces 104 collectively or individually. In one embodiment, the wireless earpieces 104 include a left earpiece and a right earpiece configured to fit into a user's 102 ears. The wireless earpieces 104 are shown separately from their positioning within the ears of the user 102 for purposes of simplicity. The wireless earpieces 104 may be configured to play music or audio, receive and make phone calls or other communications, determine ambient environmental readings (e.g., temperature, altitude, location, speed, heading, etc.), read user biometrics and actions (e.g., heart rate, motion, sleep, blood oxygenation, calories burned, etc.).

The wireless earpieces 104 may include interchangeable parts that may be adapted to fit the needs of the user 102. For example, sleeves that fit into the ear of the user 102 may be interchangeable to find a suitable shape and configuration. The wireless earpieces 104 may include a number of sensors and input devices including, but not limited to, pulse oximeters, microphones, pulse rate monitors, accelerometers, gyroscopes, light sensors, global positioning sensors, and so forth. Sensors of the wireless device 106 may also be configured to wirelessly communicate with the wireless earpieces 104.

The wireless device 106 may represent any number of wireless electronic devices, such as smart phones, laptops, gaming devices, music players, personal digital assistants, vehicle systems, or so forth. The wireless device 106 may communicate utilizing any number of wireless connections, standards, or protocols (e.g., near field communications, Bluetooth, Wi-Fi, ANT+, etc.). For example, the wireless earpieces 104 may be a touch screen cellular phone that communicates with the wireless device 106 utilizing Bluetooth communications. The wireless device 106 may implement and utilize any number of operating systems, kernels, instructions, or applications that may make use of the sensor data measured by the wireless earpieces 104. For example, the wireless device 106 may represent any number of android, iOS, Windows, open platform, or other systems. Similarly, the wireless device 106 may include a number of applications that utilize the biometric data from the wireless earpieces 104 to display applicable information and data. For example, the information (including, high, low, average, or other values) may be processed by the wireless earpieces 104 or the wireless device 106 to display heart rate, blood oxygenation, altitude, speed, distance traveled, calories burned, or other applicable information.

In one embodiment, the wireless device 106 may include any number of sensors (e.g., similar to those described with regard to the wireless earpieces 104) that may be utilized to augment the sensor readings of the wireless earpieces 104. For example, a microphone of the wireless device 106 may determine an amount and type of ambient noise. The noise may be analyzed and utilized to filter the sensor readings made by the wireless earpieces 104 to maximize the accuracy and relevance of the sensor measurements of the wireless earpieces 104. Filtering, tuning, and adaptation for the sensor measurements may be made for signal noise, electronic noise, or acoustic noise, all of which are applicable in the communication system 100. Sensor measurements made by either the wireless earpieces 104, wireless device 106, or sensor devices of the user 102 may be communicated with one another in the communication system 100. The wireless device 106 is representative of any number of personal computing, communications, exercise, medical, or entertainment devices that may communicate with the wireless earpieces 104.

With respect to the wireless earpieces 104, sensor measurements may refer to measurements made by one or both of the wireless earpieces 104. For example, the wireless earpieces 104 may determine that the sensor signal for the pulse oximeter of the right wireless earpiece is very noisy and as a result, may utilize the sensor signal from the pulse oximeter of the left wireless earpiece as the primary measurement. The wireless earpieces 104 may also switch back and forth between pulse oximeters of the left and right side in response to varying noise for both of the wireless earpieces. As a result, clearest sensor signal may be utilized at any given time. In one embodiment, the wireless earpieces 104 may switch sensor measurements in response to the sensor measurements exceeding or dropping below a specified threshold.

The user 102 may also be wearing or carrying any number of sensor-enabled devices, such as heart rate monitors, pacemakers, smart glasses, smart watches or bracelets (e.g., Apple watch, Fitbit, etc.), or other sensory devices that may be worn, attached to, or integrated with the user 102. The data and information from the external sensor devices may be communicated to the wireless earpieces 104. In another embodiment, the data and information from the external sensor devices may be utilized to perform additional processing of the information sent from the wireless earpieces 104 to the wireless device 106.

The sensors of the wireless earpieces 104 may also be positioned at enantiomeric locations. For example, a number of colored light emitting diodes may be positioned to provide variable data and information, such as heart rate, respiratory rate, and so forth. The data gathered by the LED arrays may be sampled and used alone or in aggregate with other sensors. As a result, sensor readings may be enhanced and strengthened with additional data.

In another embodiment, the wireless earpieces 104 may represent wireless devices that may be ingested or implanted into a user. For example, the described electronics may be endoscopic pills, pacemakers, tracking devices, contact lenses, oral implants, bone implants, artificial organs, or so forth.

Figure 2:
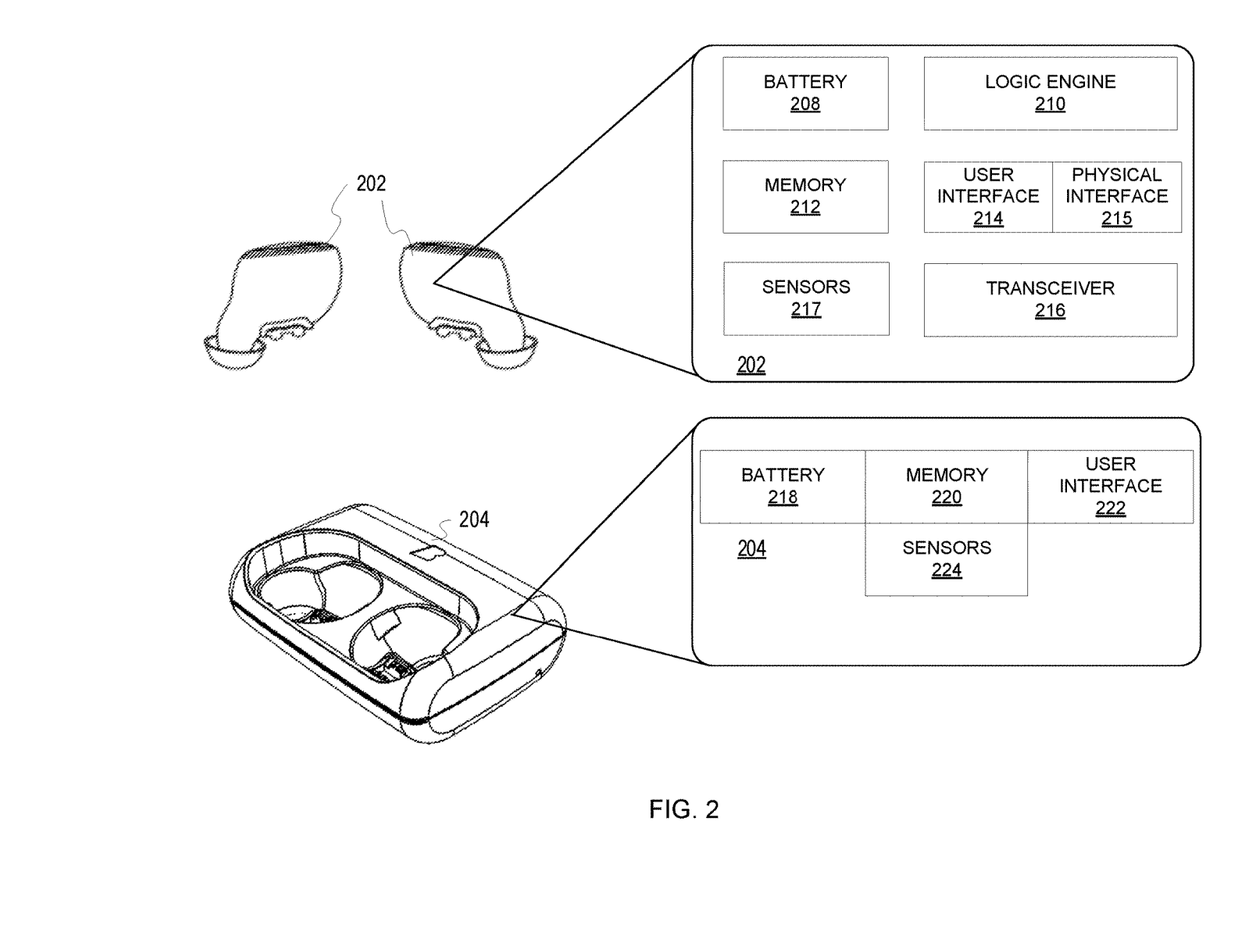
FIG. 2 is a block diagram of wireless earpieces in accordance with an illustrative embodiment.

FIG. 2 is a block diagram of a wireless earpiece system 200 in accordance with an illustrative embodiment. In one embodiment, the wireless earpiece system 200 may include wireless earpieces 202 (described collectively rather than individually) and a smart case 204. In one embodiment, the wireless earpiece system 200 may enhance communications of the wireless earpieces 202.

As shown, the wireless earpieces 202 may be secured in a smart case 204. The smart case 204 may be an open or enclosed case for securing, charging, and managing the wireless earpieces 202. As previously noted, the wireless earpieces 102 may be referred to or described herein as a pair (wireless earpieces) or singularly (wireless earpiece). The description may also refer to components and functionality of each of the wireless earpieces 202 collectively or individually.

In some embodiments, the smart case 204 may act as a logging tool for receiving information, data, or measurements made by the wireless devices. For example, the smart case 204 may be attached to a belt (e.g., belt clip, strap, etc.) or worn by the user to download data from the wireless device(s) in real-time. As a result, the smart case 204 may be utilized to store, charge, and synchronize data for the wireless earpieces 202 in any number of embodiments. The wireless earpieces 202 and the smart case 204 may have any number of electrical configurations, shapes, and colors and may include various circuitry, connections, and other components.

In one embodiment, the wireless earpieces 202 may include a battery 208, a logic engine 210, a memory 212, user interface 214, physical interface 215, a transceiver 216, and sensors 212. The smart case 204 may have a battery 218, a memory 220, an interface 222, and sensor or sensors 224. The battery 208 is a power storage device configured to power the wireless earpieces 202. Likewise, the battery 218 is a power storage device configured to power the smart case 204. In other embodiments, the batteries 208 and 218 may represent a fuel cell, thermal electric generator, piezo electric charger, solar charger, ultra capacitor, or other existing or developing power storage technologies.

The logic engine 210 is the logic that controls the operation and functionality of the wireless earpieces 202. The logic engine 210 may include circuitry, chips, and other digital logic. The logic engine 210 may also include programs, scripts, and instructions that may be implemented to operate the logic engine 210. The logic engine 210 may represent hardware, software, firmware, or any combination thereof. In one embodiment, the logic engine 210 may include one or more processors. The logic engine 210 may also represent an application specific integrated circuit (ASIC) or field programmable gate array (FPGA). The logic engine 210 may be utilize information and from the sensors 212 to determine the biometric information, data, and readings of the user. The logic engine 202 may utilize this information and other criteria to inform the user of the biometrics (e.g., audibly, through an application of a connected device, tactilely, etc.).

The logic engine 210 may also process signal data to calculate a statistical confidence interval. The signal data that corresponds to the sensor measurements may also be statistically analyzed utilizing probability distributions, general distributions, comparative analysis, and other analytic and mathematical tools, expressions, and algorithms. The logic engine 210 may determine accuracy, precisions, bias, mean, averages, standard deviations, coefficients of variation, confidence limits, and errors of the sensor measurements. The logic engine 210 may also utilize historical measurements to adjust to noise, environments, user characteristics and so forth. The historical measurements may be utilized as a baseline for comparing current sensor measurements.

In one embodiment, a processor included in the logic engine 210 is circuitry or logic enabled to control execution of a set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements of the smart case 202.

The memory 212 is a hardware element, device, or recording media configured to store data for subsequent retrieval or access at a later time. The memory 212 may be static or dynamic memory. The memory 212 may include a hard disk, random access memory, cache, removable media drive, mass storage, or configuration suitable as storage for data, instructions, and information. In one embodiment, the memory 212 and the logic engine 210 may be integrated. The memory may use any type of volatile or non-volatile storage techniques and mediums. The memory 212 may store information related to the status of the smart case 202 as well as the wireless earpieces 202. In one embodiment, the memory 212 may display instructions or programs for controlling the user interface 714 including one or more LEDs or other light emitting components, speakers, tactile generators (e.g., vibrator), and so forth.

The transceiver 216 is a component comprising both a transmitter and receiver which may be combined and share common circuitry on a single housing. The transceiver 216 may communicate utilizing Bluetooth, Wi-Fi, ZigBee, Ant+, near field communications, wireless USB, infrared, mobile body area networks, ultra-wideband communications, or other suitable radio frequency standards, networks, protocols, or communications. The transceiver 216 may also be a hybrid transceiver that supports a number of different communications. For example, the transceiver 216 may communicate with the smart case 204 or other systems utilizing wired interfaces (e.g., wires, traces, etc.), NFC or Bluetooth communications.

The components of the wireless earpieces 202 (or the wireless earpiece system 200) may be electrically connected utilizing any number of wires, contact points, leads, busses, wireless interfaces, or so forth. In addition, the wireless earpieces 202 may include any number of computing and communications components, devices or elements which may include busses, motherboards, circuits, chips, sensors, ports, interfaces, cards, converters, adapters, connections, transceivers, displays, antennas, and other similar components. The physical interface 215 is hardware interface of the wireless earpieces 202 for connecting and communicating with the smart case 204 or other electrical components.

The physical interface 215 may include any number of pins, arms, or connectors for electrically interfacing with the contacts or other interface components of the smart case 204 or other charging or synchronization devices. For example, the physical interface 215 may be a micro USB port. In one embodiment, the physical interface 215 is a magnetic interface that automatically couples to contacts or an interface of the smart case 204. In another embodiment, the physical interface 215 may include a wireless inductor for charging the wireless earpieces 202 without a physical connection to the smart case 204 or other devices.

The user interface 214 is a hardware interface for receiving commands, instructions, or input through the touch (haptics) of the user, voice commands, or predefined motions. The user interface 214 may be utilized to control the other functions of the wireless earpieces 202. The user interface 214 may include the LED array, one or more touch sensitive buttons or portions, a miniature screen or display, or other input/output components. The user interface 214 may be controlled by the user or based on commands received from the smart case 204 or a linked wireless device. In one embodiment, the user may provide feedback by tapping the user interface 214 once, twice, three times, or any number of times. Similarly, a swiping motion may be utilized across the user interface 214 (e.g., the exterior surface of the wireless earpieces 202) to implement a predefined action. Swiping motions in any number of directions may be associated with specific activities, such as play music, pause, fast forward, rewind, activate a digital assistant (e.g., Siri, Cortana, smart assistant, etc.). The LED arrays of the user interface may be utilized to perform one or more display actions alone or in synchronization with the smart case. For example, lighting up the LEDs of the wireless earpieces 202 may indicate that biometric data is being synchronized to the smart case 204.

The sensors 217 may include pulse oximeters, accelerometers, gyroscopes, magnetometers, inertial sensors, photo detectors, page sensors, miniature cameras, and other similar instruments for detecting location, orientation, motion, and so forth even when the wireless earpieces 202 are within the smart case 204. In another embodiment, the smart case 204 may also include sensors for detecting the location, orientation, and proximity of the wireless earpieces 202 and the smart case 204. These additional sensors may also be utilized to determine an acoustic noise level, electronic noise in the environment, ambient conditions, and so forth. The smart case 204 may also include an LED array, galvanic linkage or other touch sensors, battery, solar charger, actuators or vibrators, one or more touch screens or displays, an NFC chip, or other components as are referenced or described herein.

The smart case 204 may include components similar in structure and functionality to those shown for the wireless earpieces 202 including the battery 218, the memory 220, and the user interface 222. Although not shown, the smart case 204 may include logic or one or more microprocessors for implementing the processes and functions as are herein described. The battery 218 of the smart case 204 may have extra capacity which may be utilized to charge the wireless earpieces 202 a number of times. For example, the wireless earpieces 202 may be connected, linked, or nested within the smart case 204 so that the battery 218 may maintain the charge of the battery 208 as well as powering the user interfaces 214. In one embodiment, the battery 218 may be utilized until a power threshold is met. For example, the power threshold may require enough power to maintain and charge the wireless earpieces 202 for a month or more in a low power, power saving, sleep, or storage mode.

The user interface 222 of the smart case 204 may also include a touch interface or display for indicating the status of the smart case 202. For example, a light may indicate the battery status of the smart case 202 as well as connected wireless earpieces 202, download/synchronization status (e.g., synchronizing, complete, last synchronization, etc.), or other similar information. An LED array of the user interface 222 may also be utilized for display actions. In another embodiment, device status indications may emanate from the LED array of the wireless earpieces 202 themselves, triggered for display by the user interface 222 of the smart case 204. The battery 208 may itself be charged through a physical interface of the user interface 222. The physical interface may be integrated with the user interface 222 or may be a separate interface. For example, the user interface 222 may also include a hardware interface for connecting the smart case to a power supply or other electronic device. The user interface 222 may be utilized for charging as well as communications with externally connected devices. For example, the interface 210 may represent a mini-USB, micro-USB or other similar miniature standard connector. In another embodiment, a wireless inductive charging system may be utilized to initially replenish power to the wireless earpieces 202, the same inductive charging system may function in the same fashion over long periods of utility after the user purchases the device. The smart case 204 may also be charged utilizing inductive charging.

As originally packaged, the wireless earpieces 202 and the smart case 204 may include peripheral devices such as charging cords, power adapters, inductive charging adapters, solar cells, batteries, lanyards, additional light arrays, speakers, smart case covers, transceivers (e.g., Wi-Fi, cellular, etc.), or so forth.

Figure 3:
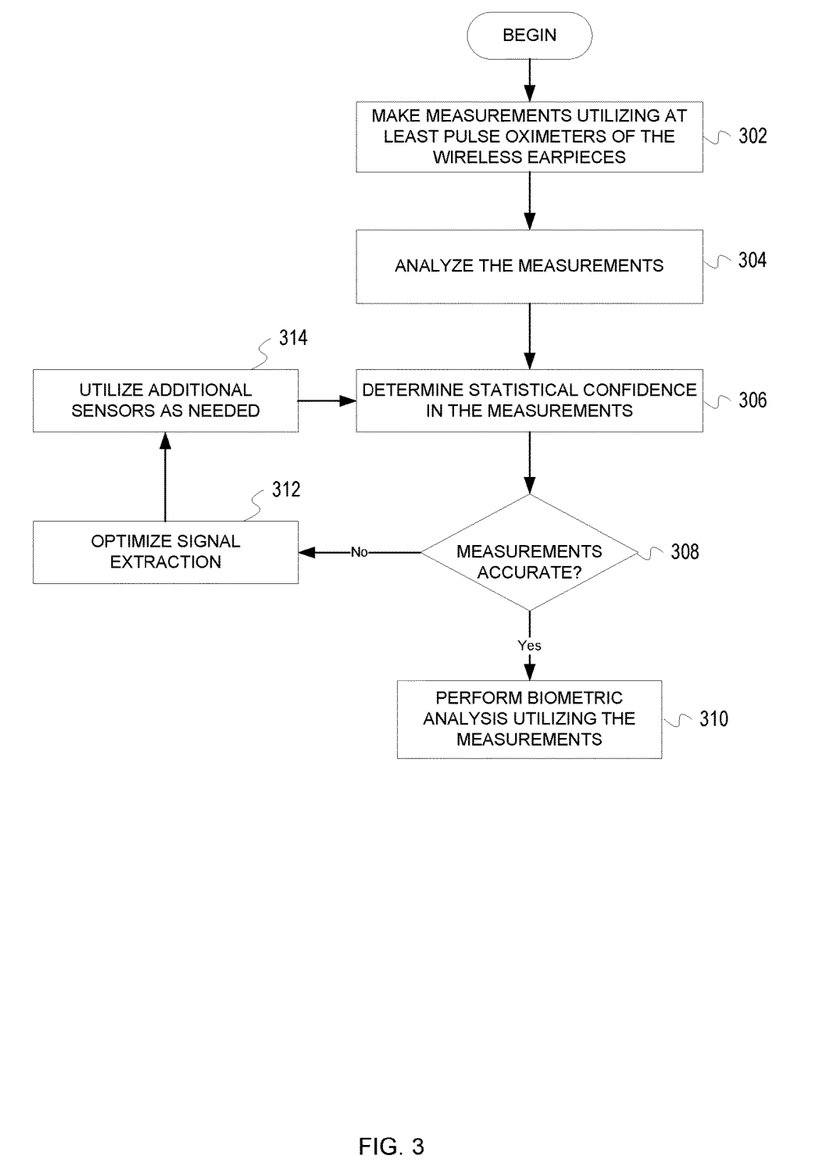
FIG. 3 is a flowchart of a process for identifying a user in accordance with an illustrative embodiment.

FIG. 3 is a flowchart of a process for optimizing sensor measurements in accordance with an illustrative embodiment. In one embodiment, the process of FIG. 3 may be implemented by one or more wireless earpieces, such as the wireless earpieces 104 of FIG. 1. The method of FIG. 3 may be performed to determine the most accurate biometric measurements and results for the user. The wireless earpieces may communicate with one or more electronic devices, such as a smart case, wireless devices, computing devices, entertainment devices, medical devices, or so forth, to perform the method of FIG. 3.

The process may begin with the wireless earpieces making measurements utilizing at least pulse oximeters of the wireless earpieces (step 302). The measurements may be made automatically in response to the wireless earpieces being activated or in a mode configured to receive user input. For example, the wireless earpieces may be powered on and ready for use by the user when removed from a smart case. The wireless earpieces may also be activated in response to an external stimulus, such as user touch, application of a magnetic field, or so forth. In one embodiment, the measurements are made by a pair or set of wireless earpieces (e.g., right and left earpieces). The measurements may also be made by just one wireless earpiece.

Next, the wireless earpieces analyze the measurements (step 304). Analysis of the sensor measurements may be made by one of the wireless earpieces (e.g., a master device), or by both of the wireless earpieces. In one embodiment, data for statistical analysis may be gathered for processing.

Next, the wireless earpieces determine statistical confidence in the measurements (step 306). In one embodiment, a statistical confidence interval may be determined for the sensor data. Confidence intervals may include a range of values (intervals) that act as good estimates of an unknown population parameter.

Next, the wireless earpieces determine whether the measurements are accurate (step 308). In one embodiment, the statistical confidence interval determined in step 306 may be utilized to determine whether the measurements made in step 302 (or at any other time are accurate). For example, the measurements from the distinct pulse oximeters may be utilized to determine whether one or both of the measurements made by the wireless earpieces are accurate. In one embodiment, lower and upper confidence bounds may define the two side limits of the confidence interval.

If the measurements are accurate as determined during step 308, the wireless earpieces perform biometric analysis utilizing the measurements (step 310). In one embodiment, the biometric may be a pulse and blood oxygenation of the user which may be relevant to a workout or physical activity being performed by the user. The biometric analysis may include determining trends, comparison against various thresholds, and so forth. In one embodiment, the biometric analysis may be utilize to generate one or more alerts for the wireless earpieces. For example, the biometric data may be utilized to identify a user and alerts may be sent indicating that there is not a match or alternatively that there is a match.

If the measurements are not accurate as determined in step 308, the wireless earpieces optimizes signal extraction (step 312). In one embodiment, the wireless earpieces may select to ignore data that is determined to be inaccurate. During step 312, the wireless earpieces may select to use one particular sensor for measurements over other sensor because of noise, user conditions, environmental conditions, or so forth. For example, only sensors, such as pulse oximeters of the left earpiece may be utilized because of a noise signal detected by the right earpiece.

Next, the wireless earpieces utilize additional sensors as needed (step 314). In one embodiment, the wireless earpieces may include a number of sensors. The additional sensors may be utilized to filter or modify the original data or to provide additional data that may supplement the measurements of the one or more pulse oximeters. The additional or other sensors may also represent sensors external to the wireless earpieces, such as chest straps (e.g., measuring heart rate, temperature, etc.), smart watches, smart jewelry, and other wearable or implantable electronics.

During step 314, additional sensor measurements may be utilized to extract noise from the sensor measurements. For example, motion noise may be associated with accelerometer data of the wireless earpieces. The noise may then be utilized to refine the sensor measurements gathered by the pulse oximeters. In one embodiment, the data may be gathered over time to more accurately refine the sensor measurements. The data may also be aggregated to provide a reference system for the wireless earpieces to read user biometrics and other data. The user may grant authority for the sensor measurements to be sent, compiled, and otherwise processed by one or more external devices, systems, portals, applications, or so forth. The data may also be sent to one or more third parties to enhance the sensor measurements made by the wireless earpieces to further adapt software, applications, instructions, or so forth.

The process of FIG. 3 may allow the wireless earpieces to utilize logic to shift sensor measurements to the sensor(s) or sensor array that provides the cleanest and most accurate signal.

The illustrative embodiments are not to be limited to the particular embodiments described herein. In particular, the illustrative embodiments contemplate numerous variations in the type of ways in which embodiments may be applied. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for enhancing sensor measurements, the method comprising:
    performing measurements utilizing biometric sensors of wireless earpieces wherein the biometric sensors include at least a first biometric sensor and a second biometric sensor;
    analyzing the measurements by the wireless earpieces to determine statistical confidence in the measurements wherein the analyzing uses the measurements from the first biometric sensor in determining the statistical confidence in the measurements of the second biometric sensor and the measurements from the second biometric sensor in determining the statistical confidence in the measurements of the first biometric sensor.

2. The method of claim 1, wherein the biometric sensors include a pulse oximeter.

3. The method of claim 1, wherein the first biometric sensor comprises a first pulse oximeter and the second biometric sensor comprises a second pulse oximeter positioned enantiomeric to the first pulse oximeter.

4. The method of claim 1, wherein the wireless earpieces further comprises:
at least one additional biometric sensor.

5. The method of claim 1, wherein if the statistical confidence of the measurements of the first biometric sensor are below a threshold, the wireless earpieces ignore the measurements, the wireless earpieces preform additional sensor measurements, or the wireless earpieces process the measurements further to remove noise and distortion.

6. The method of claim 1, wherein if the statistical confidence of the measurements of the first biometric sensor are above a threshold, the wireless earpieces ignore the measurements, the wireless earpieces preform additional sensor measurements, or the wireless earpieces process the measurements further to remove noise and distortion.

7. The method of claim 1, further comprising:
using measurements with the higher confidence level by the wireless earpiece.

8. A set of one or more wireless earpieces comprising:
a processor of the set of one or more wireless earpieces for executing a set of instructions; and
a memory of the set of one or more wireless earpieces for storing the set of instructions, wherein the set of instructions are executed to:
perform measurements utilizing biometric sensors of wireless earpieces wherein the biometric sensors include at least a first biometric sensor and a second biometric sensor;
analyze the measurements by the wireless earpieces to determine statistical confidence in the measurements wherein the analysis uses the measurements from the first biometric sensor in determining the statistical confidence in the measurements of the second biometric sensor and the measurements from the second biometric sensor in determining the statistical confidence in the measurements of the first biometric sensor.

9. The set of one or more wireless earpieces of claim 8, wherein the plurality of biometric sensors comprises at least one pulse oximeter.

10. The set of one or more wireless earpieces of claim 8, wherein the first biometric sensor comprises a first pulse oximeter and the second biometric sensor comprises a second pulse oximeter positioned enantiomeric to the first pulse oximeter.

11. The set of one or more wireless earpieces of claim 10, wherein the plurality of biometric sensors further comprises at least one accelerometer and during analysis of the measurements further utilizing accelerometer data in removing noise associated with motion from the measurements.

12. The set of one or more wireless earpieces of claim 8, wherein if the statistical confidence of the measurements of the first biometric sensor are below a threshold, the wireless earpieces ignore the measurements, the wireless earpieces preform additional sensor measurements, or the wireless earpieces process the measurements further to remove noise and distortion.

13. The set of one or more wireless earpieces of claim 8, wherein if the statistical confidence of the measurements of the first biometric sensor are above a threshold, the wireless earpieces ignore the measurements, the wireless earpieces preform additional sensor measurements, or the wireless earpieces process the measurements further to remove noise and distortion.

14. The set of one or more wireless earpieces of claim 8, wherein the set of instructions are further executed to:
use measurements with the higher confidence level by the wireless earpiece.

15. A wireless earpiece, comprising:
a frame for fitting in an ear of a user;
a logic engine controlling functionality of the wireless earpiece;
a plurality of biometric sensors performing biometric measurements of the user,
wherein the logic engine performs measurements utilizing the biometric sensors of wireless earpieces wherein the biometric sensors include at least a first biometric sensor and a second biometric sensor; analyzing the measurements by the wireless earpieces to determine statistical confidence in the measurements wherein the analyzing uses the measurements from the first biometric sensor in determining the statistical confidence in the measurements of the second biometric sensor and the measurements from the second biometric sensor in determining the statistical confidence in the measurements of the first biometric sensor.

16. The method of claim 4, wherein the at least one additional biometric sensor comprises an accelerometer and when the analyzing the measurements further uses accelerometer data in removing noise associated with motion from the measurements.

* * * * *